INVENTORS
Hugo L. Libby
Clarence R. Wandling
BY
Roland A. Anderson
Attorney

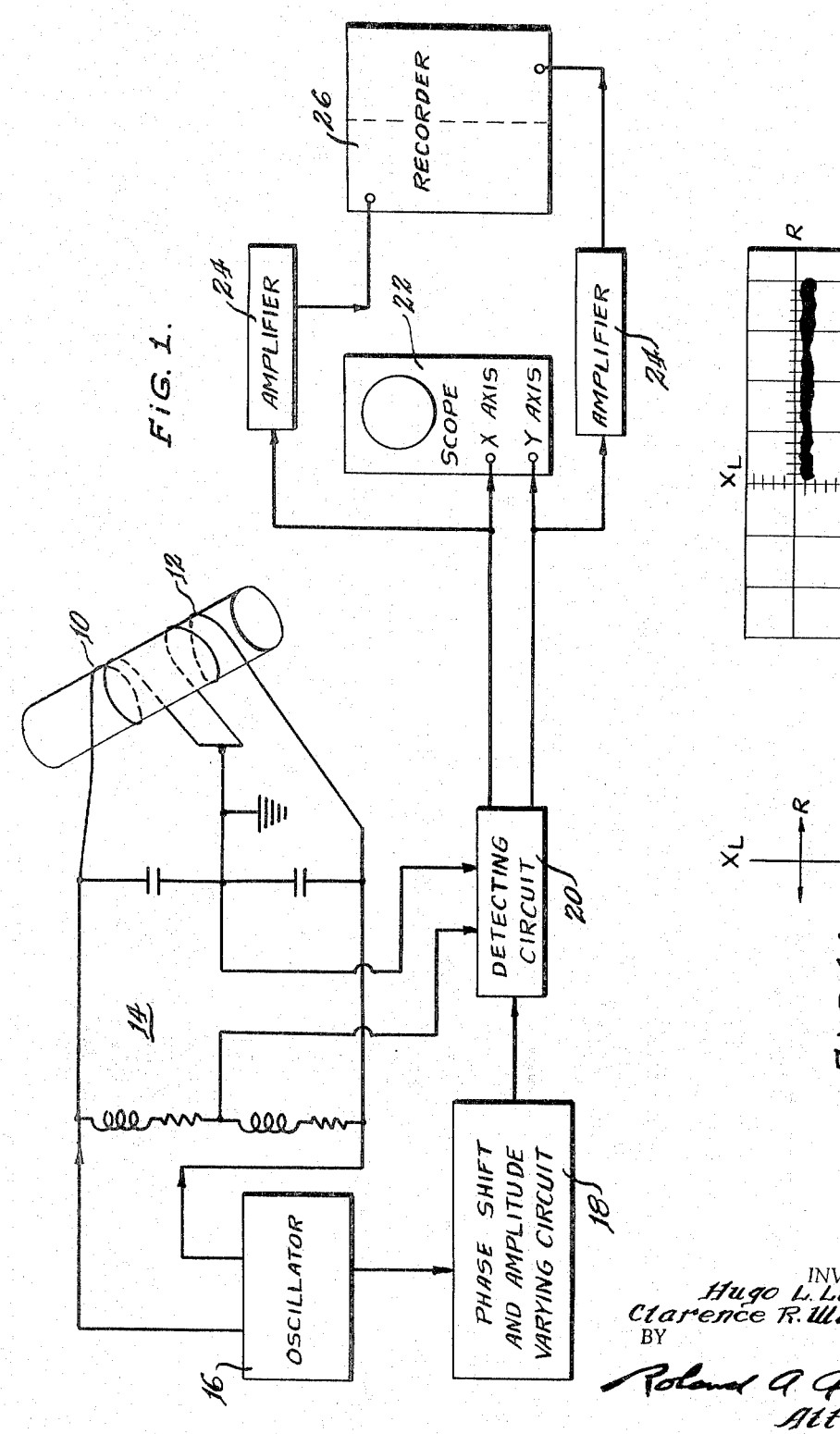

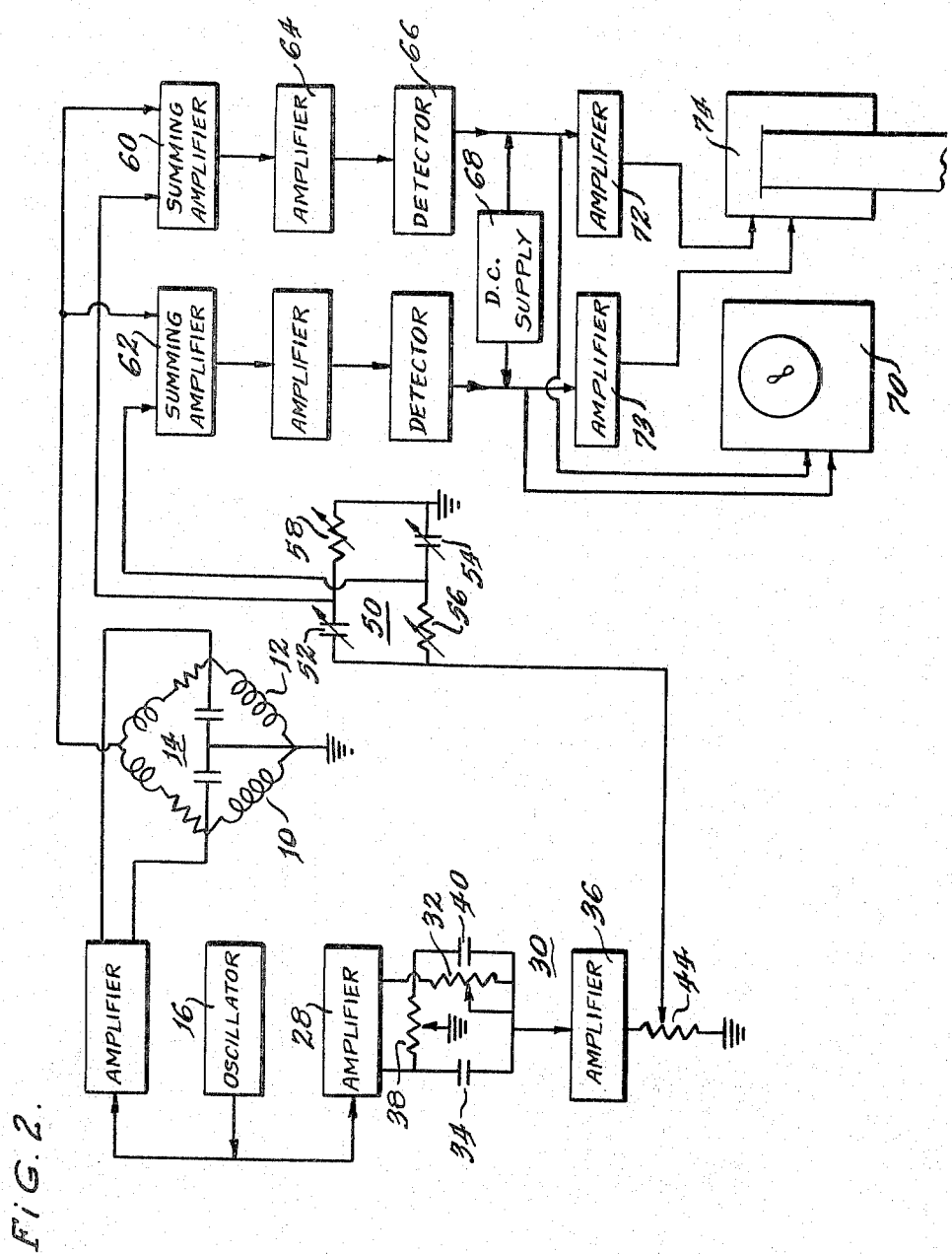

United States Patent Office 3,302,105
Patented Jan. 31, 1967

---

3,302,105
EDDY CURRENT NONDESTRUCTIVE TESTING DEVICE USING AN OSCILLOSCOPE TO IDENTIFY AND LOCATE IRREGULARITIES IN A TEST PIECE
Hugo L. Libby, Richland, and Clarence R. Wandling, Kennewick, Wash., assignors to the United States of America as represented by the United States Atomic Energy Commission
Filed Aug. 26, 1964, Ser. No. 392,347
2 Claims. (Cl. 324—40)

The invention described herein was made in the course of, or under, a contract with the United States Atomic Energy Commission.

This invention relates to nondestructive testing devices and more particularly to eddy current nondestructive testing devices.

Nondestructive testing devices using the eddy current test method are widely used in the metal industry. For these devices, the test object is placed in or near an electromagnetic induction coil and changes in the electrical impedance of the induction coil due to eddy currents flowing in the test specimen are monitored to determine the quality of the test specimen. Many test object conditions affect the impedance of the induction coil, permitting wide application thereof in the measurement of electrical conductivity, metallic cladding thickness, wall thickness of tubing, tubing diameter, detection of subsurface flaws and sorting of alloys.

The conventional single-frequency eddy current testing device discriminates against one of the test condition variables, such as coil to test object spacing, by phase discrimination techniques and records other test variations as a function of time or distance along the test object. However, conditions frequently exist where the amount of information contained in this single display is not sufficient, thereby making it difficult to relate instrument output signals to specific conditions of interest. Further, the adjustment of the conventional testing device to effect the phase discrimination is complicated.

Accordingly, it is one object of the present invention to provide a nondestructive eddy current device having improved discrimination in relating instrument output signals to specific conditions of interest in a test specimen.

It is another object of the present invention to provide a nondestructive eddy current testing device having simple control adjustments while providing improved resolution of test specimen conditions.

It is another object of the present invention to provide a nondestructive eddy current testing device capable of identifying size, depth, direction and type of irregularities in a test sample.

Other objects of the present invention will become more apparent as the detailed description proceeds.

Briefly, the present invention comprises first and second inductive coils placed on a probe in fixed relation to each other, the probe being adapted to traverse the surface of the material under test. The coils are excited by an oscillator. A signal is generated representative of the difference in current flowing in the two coils. As the probe traverses an irregularity in the specimen under test, the difference signal, changing with probe position, is representative of the complex impedance characteristic of the irregularity as a function of probe location. Means are provided responsive to the oscillator output signal for generating quadrature reference signals for detection of the difference signal. A phase shifting circuit is provided to align the noise signal due to probe wobble with one of the quadrature reference signals. The detected signals are then applied to the horizontal and vertical deflection plates of an oscilloscope, whereby the locus of the spot on the oscilloscope screen displays the complex impedance characteristic of the irregularity being traversed. Alternatively, the detected signals may be recorded on a dual channel recorder from which the complex impedance characteristic is computed in the form of a vector or phasor diagram. Flaws are not only uniquely identified by means of the complex impedance characteristic but in addition, they are more accurately located for example, from the display pattern of the complex impedance characteristic on the oscilloscope screen.

Further understanding of the present invention may best be obtained from consideration of the accompanying drawings wherein:

FIGURE 1 is a general block diagram of a device for the present invention,

FIGURE 2 is a detailed block diagram of a device for the present invention,

Figure 14:
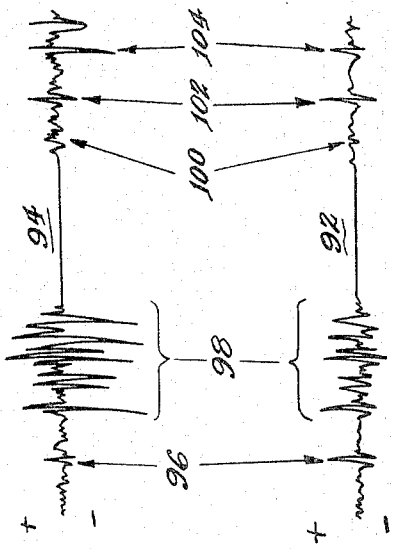
Figure 15:
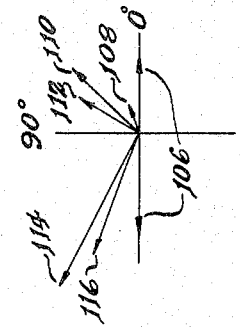
Figure 5A:
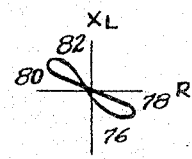
Figure 5B:
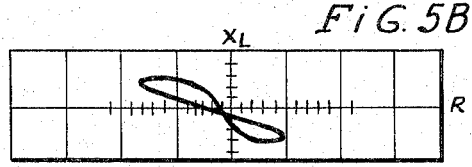
Figure 6A:
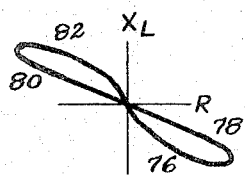
Figure 6B:
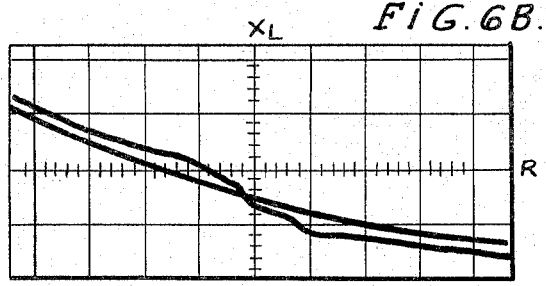
Figure 7A:
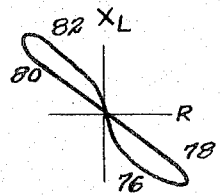
Figure 7B:
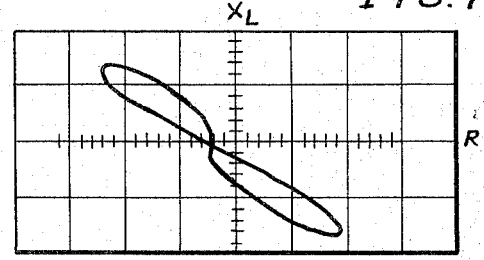
Figure 8A:
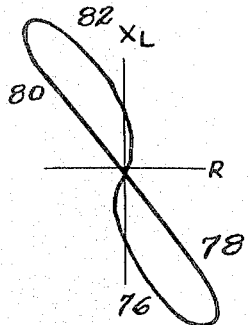
Figure 8B:
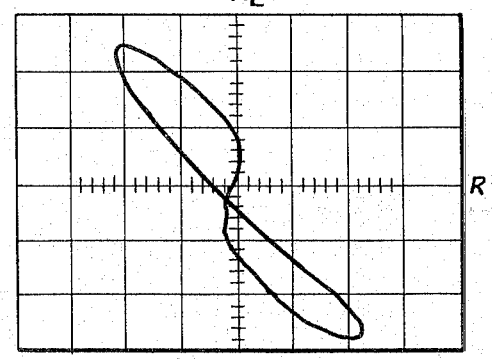
Figure 9A:
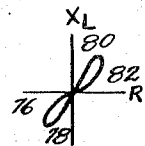
Figure 9B:
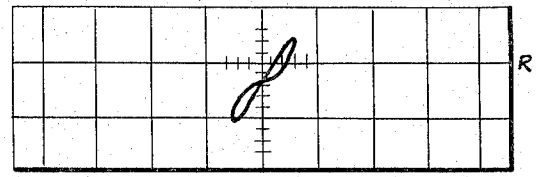
Figure 10A:
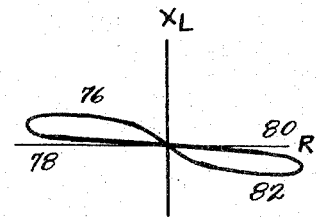
Figure 10B:
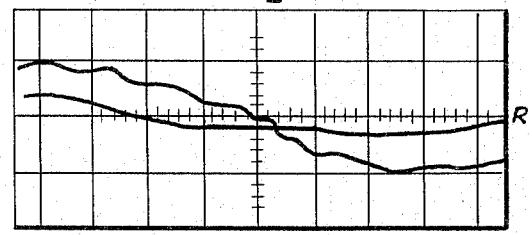
Figure 11A:
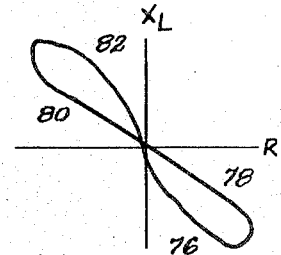
Figure 11B:
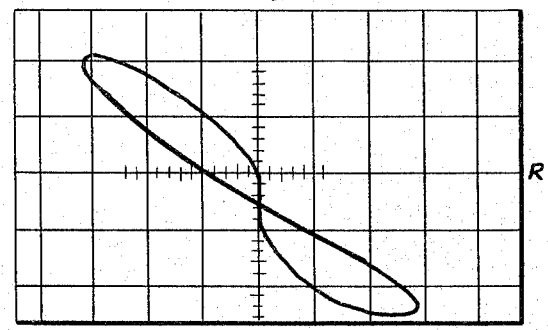
Figure 12:
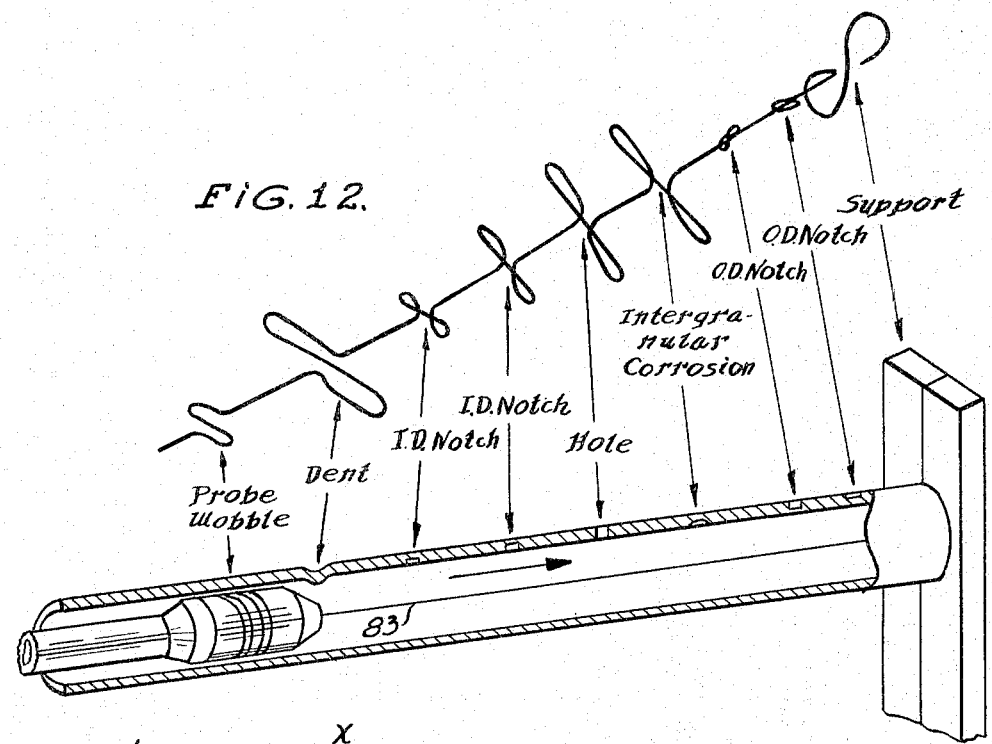
Figure 13:
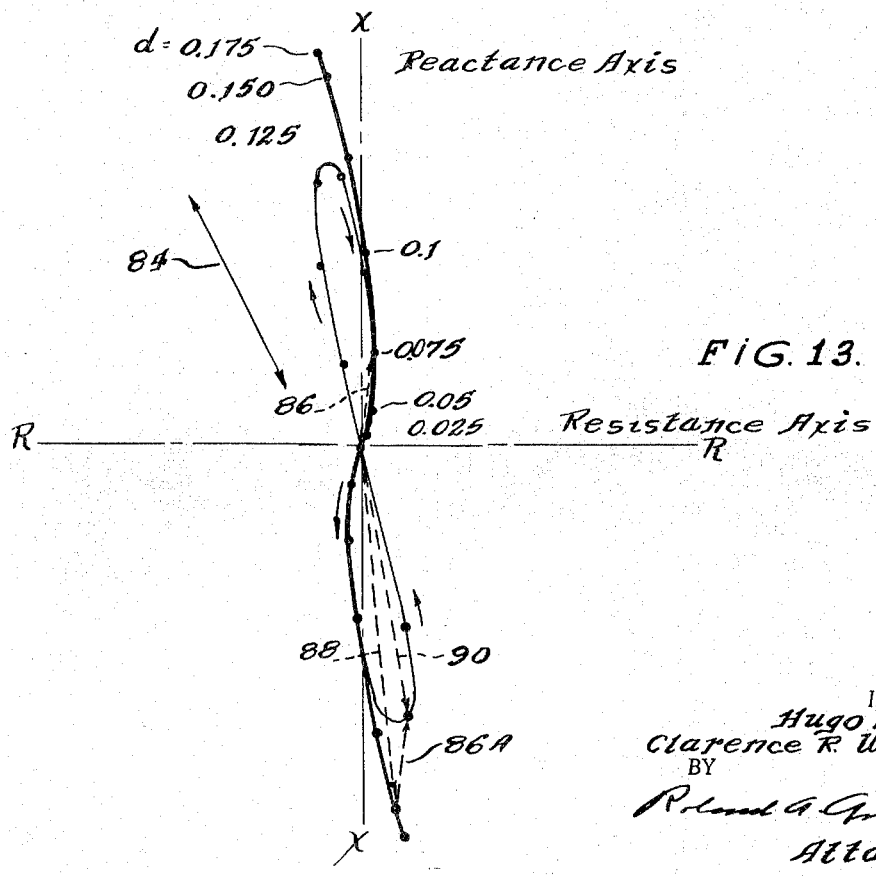

FIGURE 4a illustrates the display pattern of the complex impedance characteristic obtained with the device of FIGURE 2 for probe wobble, FIGURE 4b is the display pattern of FIGURE 4a as seen on the graticule of an oscilloscope, FIGURE 5a illustrates the display pattern of the complex impedance characteristic obtained with the device of FIGURE 2 for a particular irregularity in a test specimen, FIGURE 5b is the display pattern of FIGURE 5a as seen on the graticule of an osciloscope, FIGURE 6a illustrates the display pattern of the complex impedance characteristic obtained with the device of FIGURE 2 for another particular irregularity in a test specimen, FIGURE 6b is the display pattern of FIGURE 6a as seen on the graticule of an oscilloscope, FIGURE 7a illustrates the display pattern of the complex impedance characteristic obtained with the device of FIGURE 2 for still another particular irregularity in a test specimen, FIGURE 7b is the display pattern of FIGURE 7a as seen on the graticule of an oscilloscope, FIGURE 8a illustrates the display pattern of the complex impedance characteristic obtained with the device of FIGURE 2 for still another particular irregularity in a test specimen, FIGURE 8b is the display pattern of FIGURE 8a as seen on the graticule of an oscilloscope, FIGURE 9a illustrates the display pattern of the complex impedance characteristic obtained with the device of FIGURE 2 for still another particular irregularity in a test specimen, FIGURE 9b is the display pattern of FIGURE 9a as seen on the graticule of an oscilloscope, FIGURE 10a illustrates the display pattern of the complex impedance characteristic obtained with the device of FIGURE 2 for still another particular irregularity in a test specimen, FIGURE 10b is the display pattern of FIGURE 10a as seen on the graticule of an oscilloscope, FIGURE 11a illustrates the display pattern of the complex impedance characteristic obtained with the device of FIGURE 2 for still another particular irregularity in a test specimen, FIGURE 11b is the display pattern of FIGURE 11a as seen on the graticule of an oscilloscope, FIGURE 12 illustrates various display patterns obtained with the device of FIGURE 2 for irregularities in a test specimen, FIGURE 13 is a graphical construction of the figure eight display pattern obtained with the device of FIGURE 2, FIGURE 14 is a sample of the two-channel oscillograph record for the device of FIGURE 2, and FIGURE 15 is a vector diagram constructed from the oscillograph record of FIGURE 14.

A general embodiment of the present invention is shown in FIGURE 1. Two encircling probe coils 10 and 12 are connected differentially (in series opposition) in an A.-C. bridge circuit 14. An oscillator 16 drives the bridge circuit 14. The bridge 14 is balanced to give a null output when the coils 10 and 12 are encircling a uniform test specimen. A circuit 18 generates a reference signal which is variable in phase and amplitude and synchronized with oscillator 16. The outputs of circuit 18 and bridge circuit 14 are fed to a detecting circuit 20 which detects components of the output signal of bridge circuit 14 in phase and in phase quadrature with the reference output signal of circuit 18. The outputs of detector 20 are then fed to the vertical and horizontal deflection circuits of an oscilloscope 22 and via amplifiers 24 to a two-channel recorder 26.

The output of the bridge circuit 14 gives an output which is characteristically nearly a figure eight pattern on the voltage or impedance plane when the electromagnetic field of test coils 10 and 12 pass through an irregularity either on or beneath the surface of the specimen under test. The locus of this output signal, which is herein referred to as the complex impedance characteristic of the irregularity, carries a large amount of information regarding the test specimen irregularity causing it. However, the output at the bridge circuit 14 is small and contains undesirable variables which must be discriminated against. The discrimination against a single undesirable variable is accomplished using circuits 18 and 20, which will be described later in detail. The two outputs from circuit 20 are D.-C. for constant test specimen conditions or slowly varying D.-C. for changing test specimen conditions at the test coils 10 and 12. These D.-C. signals may be considered as descriptors of the output of bridge circuit 14 and used to describe the output by connecting them to the horizontal and vertical deflection circuits of oscilloscope 22.

Figure 3:
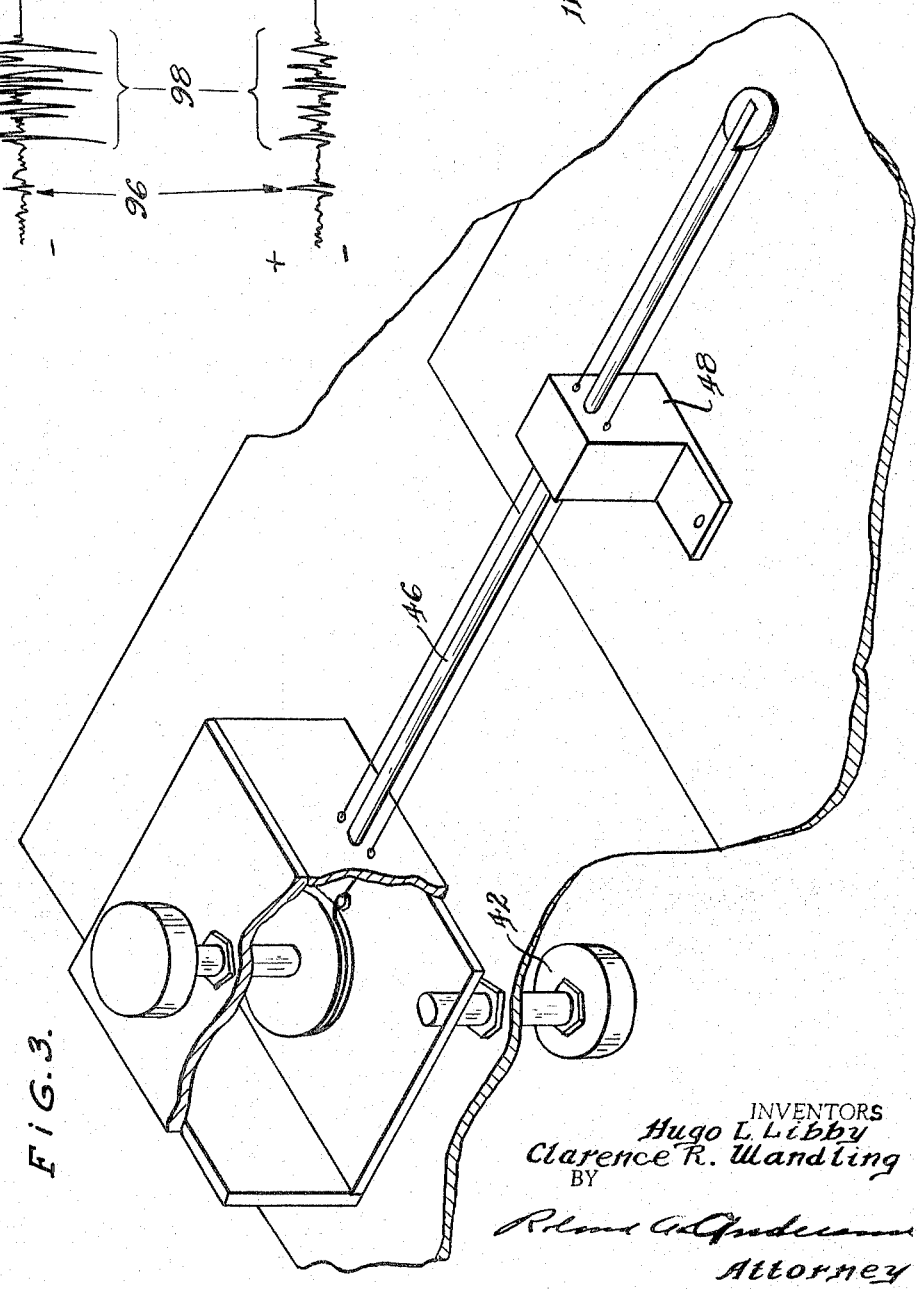
FIGURE 3 is a sketch of the graphical nulling unit for the device of FIGURE 2.

A detailed embodiment of the device of FIGURE 1 is shown in FIGURE 2. The oscillator 16 via amplifier 28 provides excitation for a graphical nulling unit 30. The graphical nulling unit is shown in detail in FIGURE 3 and is fully described in U.S. pending application entitled A Graphical Nulling Device for Nondestructive Eddy Current Testing Equipment by Hugo L. Libby, Serial No. 392,348. The potentiometer 32 and capacitance 34 of unit 30 provide a reference signal input to an amplifier 36, which input is changed in phase as the resistance value of potentiometer 32 is changed. Resistance 38 gives a balanced input necessary for proper operation of the phase shift circuit. Capacitance 40 optimizes the constancy of the phase shifter output voltage as the phase is shifted by varying resistance 32. Capacitance 34 is adjusted so that rotation of shaft 42 (see FIGURE 3) of potentiometer 32 in mechanical degrees is equal to the electrical phase shift at the input to amplifier 36 in degrees. The output of the phase shift circuit is amplified by the cathode follower amplifier 36 which has a potentiometer 44 in the output circuit thereof. As described in the above-reference pending application, the graphical nulling unit 30 produces a reference output signal whose phase is controlled by the rotation of the arm 46 of the unit 30 and whose amplitude is controlled by the position of the marking mechanism 48.

The output of the graphical nulling unit 30, a reference signal which is rotated in phase and adjusted in amplitude by manipulation of the arm 46 and marking mechanism 48 thereof, is applied to a ninety degree phase splitting circuit 50. The phase splitter circuit 50 comprises capacitors 52 and 54 and resistances 56 and 58 whose values are adjusted to give two outputs, one in phase and one in phase quadrature with respect to the reference output from the graphical nulling unit 30. The output from bridge circuit 14 is added to the in phase reference signal in a summing amplifier 60 and to the phase quadrature reference signal in a summing amplifier 62. It is necessary for the present invention that the in phase and quadrature reference signals be large compared to the output signal of bridge circuit 14 at the inputs to summing amplifiers 60 and 62.

As can be seen from FIGURE 2, there are two identical amplifier-detector channels. They both function identically except that the output signals thereof are essentially in phase quadrature with respect to each other. Accordingly, the present description will be limited to one channel, it being equally applicable to the other channel.

When the output signal of bridge circuit 14 is added to the two reference signals, the resulting signals vary in amplitude and phase as the output signal of the bridge circuit 14 varies. However, since the reference signals are large compared to the output signals of bridge circuit 14, the resulting phase shift is very small. Similarly, the changes in amplitude of the resultant signals are very small.

The output of summing amplifier 60 is amplified by amplifier 64 and applied to amplitude detector 66. Since an amplitude detector is not responsive to phase changes and the output signal of bridge 14 is small compared to the in phase reference signal, the output of amplitude detector 66 varies essentially in accordance with the component of the output signal of bridge circuit 14 which is in phase with in phase reference signal. The output of the detector 66 is, therefore, a large D.-C. signal (resulting from the in phase reference signal) plus a small component varying with the output signal of bridge circuit 14. An adjustable D.-C. supply 68 provides a variable D.-C. signal to buck out the D.-C. component of the output signal from detector 66 which results from the in phase reference signal. Thus, the remaining signal varies as the output signal of bridge circuit 14 around a null point and is applied to the vertical deflection channel of an oscilloscope 70. The beam spot of the oscilloscope 70 is thereby caused to deflect in a vertical line in accordance with the components of the test coil output signal in phase with the in phase reference signal. The output of detector 66 after the reference signal D.-C. level has been bucked out therefrom is applied via amplifier 72 to a channel of a two-channel recorder 74.

The phase quadrature channel as hereinbefore stated operates in the same manner except that its output is applied to the horizontal deflection system of oscilloscope 70 causing a horizontal deflection of the beam spot thereof in accordance with the components of the test coil output signal in phase with the phase quadrature reference signal. The output of the quadrature detector after the quadrature reference signal D.-C. level has been bucked out therefrom is applied via amplifier 73 to the other channel of the two-channel recorder 74.

The combined effect of the vertical and horizontal deflection signals is to produce on the screen of oscilloscope 70 a display pattern representing the complex impedance characteristic as represented by the output signal of bridge 14 as the probe coils 10 and 12 traverse an irregularity. Typical display patterns for tube irregularities are shown in FIGURES 4–11. For these patterns, the equipment of FIGURE 2 was operated at 200 kilocycles and internal probe coils were used. The coils were approximately 0.5 inch in diameter, wound differentially and spaced approximately 0.0625 inch apart. Each coil had 130 turns of No. 44 copper wire. The test sample was 0.625 inch O.D. type 304L stainless steel tubing with a 0.054 inch wall thickness. The standard notches were 0.125 inch long by 0.004 inch wide with the depth as stated for each figure. The patterns were taken using fixed instrument sensitivity. The actual pattern display is shown in FIGURES 4a–11b wherein the locus starts at the crossover of the figure-eight and progresses through the more curved section identified by reference numeral 76, and then through the relatively straight central portions of the pattern identified by numerals 78 and 80, followed by the curved portion 82 which terminates at the point where the display pattern commenced. It is noted that the complex impedance characteristic for the apparatus of the illustrated embodiment is independent of the velocity of the probe relative to the irregularity. The position of the irregularity is determined by noting that it is located symmetrically with respect to the coils when the locus of the relatively straight central portion of the figure-eight pattern crosses its origin.

FIGURE 4a is a display of the horizontal deflection obtained from probe wobble. The signal pattern has a large horizontal and very small vertical component. The small vertical component is due to phase discrimination adjustment by the graphical null unit 30. Probe wobble is the unwanted variable in this test and the graphical null unit 30 has been adjusted to give an essentially horizontal signal. The output of the graphical nulling unit 30 has been adjusted so that one phase of the quadrature reference signals from phase splitting circuit 50 is in phase with the signal produced by probe wobble.

FIGURE 5a shows the figure eight display pattern obtained from an irregularity in the I.D. of the tube wall. The notch was 0.013 inch deep in the I.D. of the tube wall. The angle of the central portion of the display and the amplitude of the pattern has changed from that of probe wobble shown in FIGURE 4a. The angle of the central portion of the display pattern gives depth information about the irregularity and the amplitude gives area information. FIGURE 6a is the display pattern for a shallow ring cut in the I.D. of the tubing 0.125 inch wide. The amplitude has increased from FIGURE 5a, but the angle is approximately the same. FIGURE 7a is the display pattern for a notch 0.023 inch deep in the I.D. of the tubing. Here, the amplitude has increased and the angle of the central portion of the display pattern has rotated clockwise relative to the display pattern of FIGURES 4a and 4b. FIGURE 8a is the display pattern for a 0.040 inch diameter hole drilled completely through the tube wall. FIGURE 9a is the display pattern for a notch 0.023 inch in the O.D. of the tube wall. In FIGURE 9a, the angle has rotated clockwise from the horizontal reference by more than ninety degrees compared to the probe wobble pattern of FIGURE 4a, but the amplitude has decreased compared to the 0.023 inch I.D. notch of FIGURE 5a. This is due to the notch being further away from the probe. Since the probe is an I.D. probe, there are fewer eddy currents flowing in the material toward the outside diameter of the tubing because of the skin effect.

FIGURE 10a is the display pattern for a small dent on the O.D. of the tube causing a bump on the I.D. of the tubing. The angle and amplitude of the display pattern appear quite similar to that of the shallow I.D. ring of FIGURE 6a. However, as indicated in FIGURE 10a, the locus of the complex impedance characteristic commences in the second quadrant rather than the fourth, indicating a 180° phase change from the display pattern of the I.D. ring. FIGURE 11a is the display pattern from a natural defect in a piece of tubing. This display pattern appears to be from a defect that starts on the I.D. and is approximately 0.025 inch deep and has an equivalent area slightly larger than the 0.023 inch deep, 0.125 inch long, 0.003 inch wide I.D. notch of FIGURE 7a. Based on the destructive examination of several flaws exhibiting the same signal pattern, this pattern is interpreted to represent an area of intergranular corrosion.

Thus, with the graphical nulling unit 30 adjusted to cause the probe wobble locus to appear as horizontal deflections on the oscilloscope 70, tubing wall irregularities may be monitored as to their display pattern. The display pattern has both vertical and horizontal deflection components with the angle of the central portion of the figure-eight pattern rotating clockwise with increasing depth of internal surface irregularity until wall penetration occurs. In contrast, irregularities starting at the outer surface of the tubing give display patterns having a small angle, as shown by the example for the shallow O.D. notch with the angle rotating counterclockwise with increasing notch depth until the O.D. notch penetrates the inner surface. This terminal angle is the same angle resulting from an I.D. notch penetrating to the outer surface. There are identifying lineaments in the complex impedance characteristic, as exhibited on an oscilloscope screen, which are related to irregularity size, shape and depth, and position relative to the nearest surface, and which can be readily studied using the present invention. It will be noted that the display patterns of FIGURE 12 are generated as the probe is drawn axially along the tube by a wire 83 in the direction of the arrow. FIGURE 12 representatively illustrates the display patterns for the various test sample irregularities heretofore described.

For further understanding of the present invention, reference is made to FIGURE 13 wherein is shown the construction of a complex impedance characteristic derived from the bridge output voltage for a single test coil approaching a 0.0013 inch deep by 0.125 inch long I.D. notch. The test was made at 200 kc. and the complex voltage locus $f(d)$ was determined with voltage measurements being made at probe position intervals of 0.025 inch. The measurements were started at $d=0$ which represents the starting position of the coil at which no measurable effect of the standard notch is seen. The position $d=0.175$ represents the coil position at the center of the standard notch.

For the construction of the complex impedance characteristic of FIGURE 13, the effective separation between the two test coils is 0.075 inch. The reference axes are adjusted so that voltage deflections along the vertical axis are due wholly to reactance changes of the test coil impedance. The test coil wobble locus direction is shown by the line 84. Both test coils are assumed to have the same impedance function. Since the second coil is assumed to be separated along the axis of the tube from the first coil by distance $d_1$, the bridge circuit output voltage function for the second coil is $f(d-d_1)$. The bridge output voltage of the differentially connected coils is equal to $f(d-d_1)-f(d)$, which is the difference between the two bridge outputs for the individual coils.

The construction of the figure-eight display pattern on an oscilloscope screen is best explained by showing how one general point on the curve is obtained. Let vector 86 represent the negative of the voltage output of the bridge circuit for the first coil at position $d=0.150$ inch. The bridge output due to the second coil will be the same as that of the first coil at a position $(d-d_1)$ or 0.150−0.075=0.075 inch. Thus, the bridge output for the second coil is represented by vector 88. The combined (differential) bridge output of the two coils is obtained by adding the two vectors 86 and 88 to get vector 90. This is shown by placing vector 86A at the head of vector 88. Other points on the figure-eight display pattern may be located in the same manner. A complete display pattern is the continuous curve generated by all such points as the probe coils traverse an irregularity. It is noted that if the bridge outputs for the individual coils were straight lines, no figure-eight pattern would result from the differential output. This is the approximate case for the probe wobble effect. The figure-eight display pattern is obtained for both tuned and untuned test coil conditions.

FIGURE 14 is a sample of the two-channel oscillograph record for the device of FIGURE 2. The lower record 92 is from the in phase channel recording which is adjusted by phase discrimination techniques (adjustment of the graphical null unit 30) to be insensitive to probe wobble signal. The upper record 94 is from the phase quadrature channel. The amplifiers 72 and 73 are A-C coupled so the slowly changing portions of the figure-eight display pattern (the start and finish) are attenuated. However, the central portion of the figure-eight, which is changing rapidly, is not attenuated. The resultant peak deflection of the chart record can be scaled to reconstruct the relative amplitude and phase angle of the central straight line portion of the figure-eight display pattern. As previously stated, this angle relative to the horizontal reference line is significant concerning the depth of the tube irregularity. In FIGURE 14, the following are noted points of interest. Point 96 is an O.D. signal return, point 98 I.D. signal returns, point 100 a signal return for a 0.013 inch O.D. notch, point 102 a signal return for a 0.023 inch O.D. notch and point 104 a signal return for a 0.013 I.D. notch.

A vector diagram constructed from the data scaled from the chart record of FIGURE 14 is shown in FIGURE 15 to further illustrate the chart interpretation technique. The largest excursion of the pen for each irregularity is assumed to be the governing vector factor. A consistent set of polarity directions is adopted and the resulting component amplitudes are plotted. The in phase channel deflections are plotted on the vertical axis, and the phase quadrature channel deflections plotted on the horizontal axis. The resultant of these two components gives a vector representing the signal due to the particular irregularity at that point. This vector representation of the complex impedance characteristic constitutes an alternative display pattern of the irregularity for the quadrature channel recording technique. In FIGURE 15, probe wobble signals give horizontal deflections and are taken as the reference for the vector diagram. Irregularities in the tube wall give signal vectors at different angles depending on their depths and whether the irregularities open out (or are adjacent) to the inner or outer surface of the tubing. With the inside test coil used in this test, shallow I.D. irregularities give signal vectors near 180° in FIGURE 15. A crack completely through the wall gives a vector at approximately 120°. Irregularities near the outer surface give vectors around zero to 30° with deeper ones giving correspondingly greater total angle until a crack completely through the wall will again correspond to a vector at 120°. Lowering the operating frequency shifts the vectors in a counterclockwise direction with respect to the probe wobble vectors, the greater shifts being from irregularities lying deeper in the tube wall. As previously stated, an inside probe coil was used for this test. However, with an external coil the external O.D. irregularities would give vectors near 180°, with the irregularities on the inner wall giving vectors near 30°. The following points are of interest in FIGURE 15. Point 106 is the vector for probe wobble, point 108 the vector for a 0.013 inch O.D. notch, point 110 the vector for a 0.023 inch O.D. notch, point 112 the vector for an O.D. irregularity, point 114 the vector for an I.D. irregularity and point 116 the vector for a 0.013 I.D. notch.

It is to be understood that though the foregoing description has been limited to inside probe coils, the present invention is not to be limited thereto. The invention is equally applicable to encircling type coils or flat pancake type coils. Further, though it is desirable for the present invention and though superior results are obtained thereby, the present invention is not limited to two probe coils differentially connected. The invention is also operable with one coil. With only one coil, as shown in FIGURE 13, a figure-eight output locus will not be obtained, just a single curved line, representative of the complex impedance characteristic of an irregularity, with a slight decrease in the ability to read the information contained therein.

It is also to be understood that though the foregoing description has been with respect to the testing of tubing and the present invention is particularly adaptable thereto, the present invention is not to be limited to the testing of tubing. The present invention may also be applied to other shapes such as metal bars or flat plate.

Persons skilled in the art will, of course, readily adapt the teaching of the present invention to embodiments far different than the embodiments illustrated. Accordingly, the scope of the protection afforded the invention should not be limited to the particular embodiments thereof shown in the drawings and described above but shall be determined only in accordance with the appended claims.

The embodiments of the invention in which an exclusive property or privilege is claimed are defined as follows:

1. A device for nondestructively testing a sample comprising:
    (1) a probe including first and second inductive impedances;
    (2) means for providing relative motion between said probe and said sample;
    (3) said first and second inductive impedances of said probe being fixedly spatially mounted with respect to each other along the direction of relative motion between said probe and said sample;
    (4) means, including reference oscillator means energizing said first and second inductive impedances whereby said impedances electromagnetically couple with said material, for generating a signal representative of the difference in current flowing in said inductive impedances, said difference signal varying in phase and amplitude with respect to said reference oscillator when said impedances traverse an irregularity in said material;
    (5) means for detecting said difference signal including:
        (a) means receiving the output signal of said reference oscillator for generating first and second detecting signals in phase quadrature, and for shifting the phase of said first detecting signal such that it is in phase with the noise on said difference signal when said probe wobbles relative to a flawless material;
        (b) means receiving said difference signal and said quadrature detecting signals for adding said difference signal to each of said quadrature detecting signals;
        (c) means receiving the output signals of said adding means for generating unidirectional voltages representative of the amplitudes of the added signals; and
    (6) recording means including a screen and a light spot adapted to move on said screen, said recording means receiving the output signals of said unidirectional voltage generating means and moving the light spot in one direction on said screen responsive to one of said output signals of said unidirectional voltage generating means and in a transverse direction responsive to the other of said output signals of said unidirectional voltage generating means;
        whereby the locus of said light spot generates a display which serves to identify and determine the location of irregularities in said material as they are traversed by said probe.

2. The apparatus of claim 1 wherein said coil difference signal generating means comprises, in addition to said oscillator means:
  (1) first and second capacitor means connected respectively in circuit with said first and second coils to tune them to the operating frequency of said oscillator means;
  (2) conductive means connecting said tuned coils in series opposition with each other and in parallel with said oscillator; and
  (3) third and fourth reactive impedance means connected in series across said oscillator for forming a bridge circuit with said coils, the output signal of said bridge being taken between a point joining said coils and a point joining said third and fourth reactive impedance, said third and fourth reactive impedances being selected such that said output signal is a null when said coils are coupled to a faultless tube;
    whereby said bridge output signal is representative of the difference in current flowing in said coils.

References Cited by the Examiner

UNITED STATES PATENTS

| | | | |
|---|---|---|---|
| 2,162,009 | 6/1939 | Goldsmith | 324—34 |
| 2,806,992 | 9/1957 | Foerster | 324—34 |
| 2,918,621 | 12/1959 | Callan et al. | 324—37 |
| 2,921,229 | 1/1960 | Foerster | 324—34 |
| 2,945,176 | 7/1960 | Irwin | 324—40 |
| 3,004,215 | 10/1961 | Datt et al. | 324—34 |
| 3,075,145 | 1/1963 | Goldberg et al. | 324—34 |

FOREIGN PATENTS 856,692   12/1960   Great Britain.

WALTER L. CARLSON, *Primary Examiner*.

RICHARD B. WILKINSON, RUDOLPH V. ROLINEC, *Examiners.*

R. J. CORCORAN, *Assistant Examiner*.